United States Patent Office 2,928,835
Patented Mar. 15, 1960

2,928,835
NEW ESTERS

Robert Michel Jacob, Ablon-sur-Seine, and Nicole Marie Joseph, Paris, France, assignors to Societe des Usines Chimiques Rhone-Poulenc, Paris, France, a body corporate of France No Drawing. Application February 19, 1959
Serial No. 794,219

10 Claims. (Cl. 260—294.3)

This invention has for its object to provide new chemical compounds having unexpectedly useful properties. More particularly the invention concerns new esters of 2-piperidylphenyl-methanols and ethanols of outstanding value in medicine on account of their stimulant effect upon the central nervous system and ancillary properties. The application is a continuation in part of application Serial No. 685,379, filed September 23, 1957, of applicaciation Serial No. 701, 368, filed December 9, 1957, and of application Serial No. 746,625, filed July 7, 1958 (itself a continuation-in-part of application Serial No. 685,379), all of which are now abandoned.

2-piperidylphenylmethanols of the general formula:

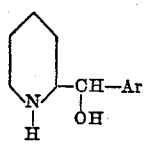

(I)

wherein Ar represents a phenyl group or a phenyl group containing in the 4-position a substituent of the group consisting of halogen, lower alkyl, lower alkoxy and methylenedioxy (the last being also linked to the benzene ring in the 3-position), possess two asymmetrical carbon atoms and consequently they can each exist as a racemic mixture in two stereoisomeric forms: erythro (form A) and threo (form B) (cf. K. E. Crook and S. H. McElvain, J. Amer. Chem. Soc., 52, 4006 (1930)). The erythro-form is generally obtained as the main product of catalytic reduction of a 2-benzoylpyridine, optionally substituted in the benzene nucleus, the two forms being separable by selective solvent extraction. When one or other of the two forms or a mixture thereof is treated with thionyl chloride in the cold and the chloro derivative thus obtained is hydrolysed, for example by means of an aqueous solution of a mineral acid or of silver nitrate, the threo-form only is obtained. The erythro and threo-forms of the 2-piperidylphenylmethanols are also distinguished by systematic differences in their infra-red spectra.

Similarly 2-phenyl-2-(2-piperidyl)-ethanol, of the formula:

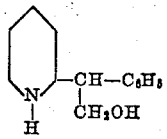

(II)

also possesses two asymmetrical carbon atoms and can also exist as a racemic compound in two stereoisomeric forms. The invention, insofar as it deals with ethanol derivatives, is concerned only with the racemic mixture (or the optically active isomers therein) which has the following characteristics:

Base: M.P.=88–90° C. (cap.)
Hydrochloride: M.P.=165–166° C. (cap.)

It has now been unexpectedly discovered that certain hitherto unknown esters of threo-2-piperidylphenyl-methanols in contradistinction to esters of the erythro-type, have useful application in medicine as will hereinafter be more particularly described. These threo-esters (in the form of racemic mixtures and optically active isomers) of the methanol compounds conform to the general conventional formula:

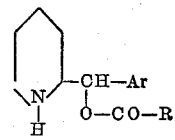

(III)

wherein R represents a hydrogen atom or an alkyl group containing at most two carbon atoms and Ar represents a phenyl group which may carry in the 4-position a halogen, lower alkyl, lower alkoxy, or methylenedioxy substituent. The ethanol compounds have a methylene group, —CH$_2$—, between the CH group and the O atom which conform to the general formula:

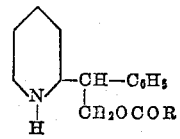

(IV)

These esters possess very interesting central nervous stimulant properties which are observable in particular in the animal (rat) by a motor hyperactivity and an augmentation of its psychic aptitude in carrying out certain tests. The acetic esters, i.e. those in which R is methyl, are the most active in this respect.

The specific character of the properties of these esters is illustrated by the following comparative data; the date also demonstrates the unexpectedness of these properties having regard to the properties of the corresponding alcohols of the threo-form as well as those of the erythro-form and to the properties of the erythro-esters and a di-acyl compound of closely related chemical composition. The data in question was obtained from pharmacodynamic tests on the following compounds designed to ascertain the extent of their value as stimulators of central nervous activity:

(A) Threo-1-acetoxy-1-phenyl-1-(2-piperidyl)methane
(B) Erythro-1-acetoxy-1-phenyl-1-(2-piperidyl)methane
(C) Threo-1-phenyl-1-(2-piperidyl)methanol
(D) Erythro-1-phenyl-1-(2-piperidyl)methanol
(E) Threo-1-acetoxy-1-phenyl - 1 - (1-acetyl-2-piperidyl)-methane.

Referring to the above-identified compounds, A is the preferred compound of the present invention; B has not previously been described in the literature. It is the diastereoisomeric form of A and is included here for the purpose of demonstrating the unexpectedly singular properties of the threo-esters; C and D are described in a paper by Crook et al. published in J. Amer. Chem. Soc., vol. 52, p. 4010; E was apparently produced by Crook et al., since they refer in their aforementioned paper to a reaction between 1 mole of C and approximately 2 moles of acetic anhydride, though they do not describe the product, and the compound E used in the present tests was made by carrying out the same reaction.

The tests in question took the following form:

(a) ANTIBARBITURIC ACTION

The narcoleptic action of the central nervous stimulants is one of the most characteristic features of these products. The experimental procedure employed is that according to B. B. Brown and H. W. Werner's technique [J. Pharmacol., 110, 180 (1954)] and is as follows:

Rats are anaesthetized intravenously with 25 mg./kg. I.V. pentobarbital, which brings about a 20-30 minutes average duration of narcosis. The product to be determined as a stimulant is also injected intravenously, five minutes after the pentobarbital. The time of narcosis of the rats receiving the stimulant is compared with the time of narcosis of control rats which have received physiological serum five minutes after the pentobarbital. The dose of stimulant which reduces the duration of narcosis by 50% is determined by plotting the graph of duration of narcosis against the logarithm of the dose of stimulant. With powerful stimulants, a 100% reduction of the narcosis (with the animal awakening at the time of the injection of the stimulant) may be reached; with products which are not very active as stimulants even a 50% decrease can never be attained.

(b) LOCOMOTOR ACTIVITY

The technique employed is a variation of the standard technique used by J. W. Schulte et al. [J. Pharmacol., 71, 62 (1941)]. Mice are placed one at a time into a registering box. A meter enables the number of displacements effected by each animal during 5 minutes to be counted. Each mouse first undergoes a control test and the number of displacements is counted. The stimulant is then administered orally in 50 and 100 mg./kg. doses (each dose is administered to 10 mice); then 1½ hours after the ingestion, the displacements effected in the registering box in five minutes by each animal are counted again. The percentage decrease (—) or the percentage increase (+) of the displacements compared with the control test is determined.

The following results were obtained:

| Stimulant | Antibarbituric Action | | Locomotor activity of mice | | |
|---|---|---|---|---|---|
| | mg./kg. dose (I.V.) reducing the narcosis by 50% | Remarks | Dose, mg./kg. (P.O.) | Percent Effect compared with the control animals | Remarks |
| A | 4.5 | powerful stimulating effect with awakening at the time of injection. | 50 100 | +140 +211 | Stimulating effect: increased locomotion. |
| B | above 30 | | 50 100 | −55 −71 | |
| C | 30 | decreased stimulation with higher doses. | 50 100 | −38 −66 | Narcotic effect. |
| D | above 50 | maximum reduction of narcosis with dose of 50 mg./kg. is 33%. | 50 100 | −54 −71 | decreased locomotion. |
| E | inactive | hypnotic activity | 50 100 | −61 −69 | |

From the results of the above tests the following conclusions can be arrived at:

(i) That of the compounds tested, A shows an antibarbituric acid over six times as great as the next most active compound, viz. C;

(ii) That of the compounds tested, A is the only product which brings about an increase in the locomotor activity of mice and then to an extent of over 200% at a dose of 100 mg./kg.;

(iii) That since product B shows a very low antibarbituric action compared with A and shows a retarding effect on locomotor activity, it is surprising that its diastereoisomer should possess such powerful properties as a central nervous stimulant.

According to further features of the present invention, the aforesaid new threo-esters of Formula III in which Ar is unsubstituted may be prepared by the following methods employing racemic mixtures or optically active isomers of the starting materials specified.

(1) Esterification of threo-2-piperidylphenylmethanol or an acid addition salt thereof by known methods for the esterification of amino-alcohols. Preferably esterification is effected by the action of the chloride or anhydride of an acid RCOOH (where R is as hereinbefore defined) on a hydrohalide of 2-piperidylphenylmethanol.

(2) Chlorination of erythro-2-piperidylmethanol or a mixture of erythro- and threo-forms followed by conversion of the 1-chloro-1-phenyl-1-(2-piperidyl)methane obtained of the formula:

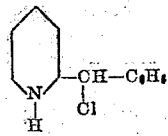

(V)

into the desired 2-piperidylphenyl ester conforming to Formula III (threo-form) by:

(a) Hydrolysis, for example by means of aqueous silver nitrate solution or of an acid such as hydrochloric acid in aqueous or alcoholic solution, followed by esterification of the threo-2-piperidylphenylmethanol obtained, or (b) The action of a metal salt, preferably the silver salt, of the appropriate acid RCOOH (where R is as hereinbefore defined).

The chlorination step is preferably effected by the use of thionyl chloride in, for example, chloroform solution.

(3) Transposition of an addition compound formed between a strong acid, such as hydrochloric acid, and (1-acyl-2-piperidyl)phenyl-methanol of erythro- or threo-form of the formula:

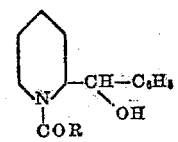

(VI)

wherein R is as hereinbefore defined. The transposition of the —COR grouping is best effected by heating at an elevated temperature, for example at about 100° C. When the piperidylphenylmethanol of Formula VI is of erythro-form, the transposition is accompanied by epimerisation to the threo-form.

(4) Reduction of the pyridyl group of a pyridyl ester of the general formula:

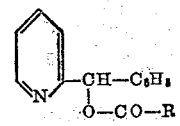

(VII)

(wherein R is as hereinbefore defined) by known methods for the reduction of a pyridyl group to piperidyl. Preferably the reduction is effected by hydrogenation in the presence of a catalyst, for example, by means of hydrogen with the pyridyl ester in acetic acid in the presence of Adams' platinum.

Threo-esters of Formula III in which Ar is substituted may be obtained by appropriate adaptation of any of the foregoing methods. The 2-ethanol esters of Formula IV may be prepared by esterification, preferably using an acid halide, of the amino alcohol or the hydrochloride or other acid addition salt thereof.

The racemic esters obtained by the aforesaid different methods may optionally be separated into the individual optically active isomers by direct resolution. The optically active esters possess qualitatively analogous properties to those of the racemates: they differ quantitatively, however, by the intensity of their activity which, combined with notable differences in their secondary effects, renders their use for therapeutic purposes probably more advantageous. In particular, laevorotatory threo-1-acetoxy-1-phenyl-1-(2-piperidyl)methane hydrochloride is of outstanding utility. Also of especial importance are Threo-1-acetoxy-1-(4-methoxyphenyl)-1-(2 - piperidyl)-methane Threo-1-acetoxy-1-(4-chlorophenyl) - 1 - (2 - piperidyl)-methane Threo-1-acetoxy-1-(4-methylphenyl)-1 - (2 - piperidyl)-methane Threo-1-acetoxy-1-(3:4-methylenedioxyphenyl) - 1 - (2-piperidyl)methane It is emphasised that with the esters of the present invention the period of excitation resulting from administration to animals is not followed by a period of depression as is the case with certain other stimulants such as, for example, amphetamine. The esters of substituted threo-2-piperidylphenylmethanols conforming to general Formula III are, therefore, useful in the treatment of states of fatigue and depression.

For therapeutic purposes, the esters of general Formulae III or IV are employed in the form of acid addition salts containing pharmaceutically acceptable anions (such as hydrochlorides and other hydrohalides, phosphates, nitrates, sulphates, maleates, fumarates, citrates, tartrates, methanesulphonates and ethanedisulphonates). Such salts are within the scope of the present invention.

The following examples illustrate the invention.

*Example I*

Threo-2-piperidylphenylmethanol, M.P. 177–178° C. (cap.), (2 g.) is converted into the hydrochloride by dissolution in anhydrous ether and the addition of a solution of ethereal hydrogen chloride. The hydrochloride is separated, a mixture of acetyl chloride (20 cc.) and acetic anhydride (4.5 cc.) is added and the mixture is heated on a water bath for 4 hours. After evaporation in vacuo, the residue is triturated with a mixture of acetone (30 cc.) and ether (60 cc.). The solid is separated and washed with acetone, boiling methyl ethyl ketone, and then with ether. Threo-1-acetoxy-1-phenyl-1-(2-piperidyl)methane hydrochloride (2.5 g.), M.P. 229–230° C. (cap.), is obtained.

*Example II*

A mixture of threo-2-piperidylphenylmethanol hydrochloride (2.14 g.), M.P. 121–122° C., and propionyl chloride (25 cc.) is heated for 30 minutes at 80° C. Solution occurs followed by precipitation. The mixture is evaporated to dryness in vacuo and treated as in the preceding example. Threo-1-propionyloxy-1-phenyl-1-(2-piperidyl)methane hydrochloride (2.4 g.), M.P. 207–207.5° C., is thus obtained after recrystallisation from isopropanol.

*Example III*

Erythro-2-piperidylphenylmethanol hydrochloride (150 g.) is added little by little with agitation, while the temperature is maintained below 5° C., to an ice-cooled solution of thionyl chloride (300 cc.) in chloroform (300 cc.). At the end of the addition the temperature is allowed to rise to 20° C. and the agitation continued for 1 hour. Ether (1.5 litres) is added and an abundant crystalline precipitate forms between the aqueous and organic phases. The phases are mixed and allowed to stand overnight in a refrigerator. The product is separated and 1-chloro-1-phenyl-1-(2-piperidyl)-methane hydrochloride (155 g.) is obtained, M.P. 213° C. The 1-chloro-1-phenyl-1-(2-piperidyl)methane hydrochloride (5 g.) is dissolved with warming in water (50 cc.), 17% silver nitrate solution (50 cc.) is added and an abundant precipitate forms. The solution is boiled for 1 hour and the product is allowed to cool and the excess silver precipitated by the addition of hydrochloric acid. The product is filtered and the mother liquors made alkaline. Threo-2-piperidylphenylmethanol (3.3 g.) is obtained. By acetylation as described in Example I, the same product is obtained as that which is described in Example I.

*Example IV*

Erythro-2-piperidylphenylmethanol hydrochloride (20 g.) is added little by little with stirring to an ice-cooled solution of thionyl chloride (40 cc.) in chloroform (40 cc.). The agitation is continued for 1 hours at 20° C. and the product is then poured little by little into crushed ice (270 g.). The product is heated to evaporate chloroform and refluxed for 2 hours. The product is treated with decolourising charcoal, filtered, and the filtrate made alkaline. Threo-2-piperidylphenylmethanol (17 g.) is thus obtained.

By acetylation of its hydrochloride the same product is obtained as that which is described in Example I.

*Example V*

2-pyridyl phenyl ketone (50 g.) is reduced with Adams' platinum in glacial acetic acid and 2-piperidylphenylmethanol (50 g.), which consists of a mixture of erythro and threo forms (M.P. 136–137°), is obtained. This product is dissolved in chloroform (500 cc.) containing 15% ethereal hydrogen chloride (65.5 cc.). The solution is poured into a mixture of thionyl chloride (120 cc.) and chloroform (150 cc.), the temperature being maintained between 0 and +5° C. The mixture is agitated for 15 minutes at this temperature and the temperature then allowed to rise to room temperature over the space of 1 hour. The reaction product is then poured onto crushed ice (600 g.) and water (200 cc.), the temperature is allowed to return to normal and the product then boiled for 1 hour—the chloroform being distilled off. The remaining aqueous solution is decolourised with charcoal, filtered hot, the filtrate cooled to 0° C. and made alkaline while cold by the addition of sodium hydroxide (d=1.33, 400 cc.). A white product is precipitated, which is collected, washed with water and dried in vacuo at about 60° C. A product melting at 172° C. (48.5 g.) is obtained which is practically pure threo-2-piperidylphenylmethanol. By acetylation of its hydrochloride as described in Example I it is converted into threo-1-acetoxy-1-phenyl-1-(2-piperidyl) methane hydrochloride.

*Example VI*

A suspension of 1-chloro-1-phenyl-1-(2-piperidyl)methane hydrochloride (2 g.) and silver acetate (6 g.) in acetic acid (50 cc.) is heated under reflux for 5 hours with agitation. The mixture is allowed to stand overnight, the product separated and concentrated in vacuo. The residual oil is dissolved in a 4% solution of hydrochloric acid in ethanol, decolourised with animal charcoal and precipitated by the addition of ether to the solution. After separation and drying, threo-1-acetoxy-1-phenyl-1-(2-piperidyl)methane hydrochloride (0.92 g.) is obtained.

*Example VII*

Laevorotatory threo-2-piperidylphenylmethanol (1.25 g.) is converted into the hydrochloride which is treated with a mixture of acetyl chloride (1.25 cc.) and acetic anhydride (3.75 cc.). After allowing to stand at ambient temperature for two hours, the reaction mixture is evaporated in vacuo. The residue is triturated with acetone (10 cc.) and anhydrous ether (70 cc.). After recrystallisation of the solid from a mixture of methanol (20 cc.) and ether (60 cc.), laevorotatory threo-1-acetoxy-1-phenyl-1-(2-piperidyl)methane hydrochloride (1.5 g.) is obtained, M.P. 232° C. (cap.); $[\alpha]_D^{20}=-60°$ (c.=0.4; chloroform).

Laevorotatory threo-2-piperidylphenylmethanol, M.P. 149–150° C.; $[\alpha]_D^{20}=-45°$ (c.=3.5; chloroform), used as starting material can be obtained from dextrorotatory erythro-2-piperidylphenylmethanol hydrochloride, M.P. 219–220° C. (cap.); $[\alpha]_D^{20}=+7°$ (c.=3.5, chloroform), by proceeding as in Examples III or IV. The last-mentioned phenylmethanol can itself be prepared by hydrogenation in acetic acid in the presence of Adams' platinum of dextrorotatory 2-pyridylphenylmethanol, M.P. 64° (cap.); $[\alpha]_D^{20}=+108°$ (c.=4.2, chloroform), itself prepared by resolution of 2-pyridylphenylmethanol by means of d-tartaric acid in ethanol.

Laevorotatory threo - 2 - piperidylphenylmethanol may also be prepared by resolution of the racemate by means of (—) dibenzoyltartaric acid. Thus, racemic threo-2-piperidylphenylmethanol (19.1 g.), M.P. 173° C., and (—) dibenzoyltartaric acid (35.8 g.) are dissolved with warming in n-propanol (174 cc.). The mixture is gently agitated for 21 hours at 20° C. The precipitate formed is filtered off, washed with propanol (3×10 cc.) and dried. 2-piperidylphenylmethanol dibenzoyltartrate (18.3 g.) is obtained. Starting with the said dibenzoyltartrate, there is obtained laevorotatory threo-2-piperidylphenylmethanol, M.P. 150° C.; $[\alpha]_D^{20}=-37°$ (c.=3.5, chloroform).

Example VIII

Proceeding as in Example VII commencing with dextrorotatory threo-2-piperidylphenylmethanol, dextrorotatory threo-1-acetoxy-1-phenyl-1-(2-piperidyl)methane hydrochloride is obtained, M.P. 232° C. (cap.); $[\alpha]_D^{20}=+71°$ (c.=0.3, chloroform).

The dextrorotatory threo-2-piperidylphenylmethanol can itself be obtained from laevorotatory 2-pyridylphenylmethanol, M.P. 64° C.; $[\alpha]_D^{20}=-108°$ (c.=4.4, chloroform).

Example IX

Threo-2-piperidylphenylmethanol (191 g.) is dissolved in acetic acid (1 litre). When the solution is clear 15% ethereal hydrogen chloride (250 cc.) and acetic anhydride (210 cc.) is added. The temperature is taken from 20 to 50° C. in 30 minutes and the mixture is allowed to cool. The product which crystallises out is separated, washed with acetic acid and dried under reduced pressure. Threo-1-acetoxy-1-phenyl-1(2-piperidyl)methane hydrochloride (218 g.) is thus obtained which is identical to that described in Example I.

Example X

Erythro-1-(1-acetyl-2-piperidyl)-1-phenylmethanol (5 g.) is dissolved in anhydrous benzene (60 cc.) and a solution of 4% ethereal hydrogen chloride (60 cc.) is added. The precipitate obtained is washed with ether and dried. The product (1.5 g.) is heated at 115° C. for 1½ hours producing a melt which solidifies. The mass obtained is washed with methanol and then with anhydrous ether. Threo-1-acetoxy-1-phenyl-1-(2-piperidyl)methane hydrochloride (0.625 g.) is obtained.

The erythro-1-(1-acetyl-2-piperidyl)-1-phenylmethanol used as starting material may be obtained by heating a mixture of erythro-2-piperidylphenylmethanol (19.1 g.) and acetic anhydride (24 cc.) for 10 minutes at 70° C. After cooling and treating with water, sodium bicarbonate is added in small portions until the pH is 6.5. The amide formed is extracted with chloroform, the solvent evaporated and the residue dissolved in benzene. Petroleum ether is added to the solution and erythro-1-(1-acetyl-2-piperidyl)-1-phenylmethanol (17.8 g.) is obtained, M.P. 148° C.

Example XI

Threo - 1 - (1-acetyl-2-piperidyl)-1-phenylmethanol (2 g.), M.P. 145° C. is dissolved in benzene (30 cc.) and 15% ethereal hydrogen chloride (6 cc.) is added. The precipitate obtained is washed with ether, dried and maintained at 120° C. for 1½ hours. Threo-1-acetoxy-1-(2-piperidyl)-1-phenylmethane hydrochloride (2.2 g.) is obtained.

Example XII

Threo-1-(1-acetyl-2-piperidyl)-1-phenylmethanol (1 g.) is dissolved in a mixture of acetone (10 cc.) and concentrated hydrochloric acid (0.5 cc.). After leaving to stand for 2 hours, threo-1-acetoxy-1-(2-piperidyl)-1-phenylmethane hydrochloride (0.684 g.) is obtained.

Example XIII

Following the procedure of Example XI but commencing with threo-1-(1-formyl-2-piperidyl)-1-phenylmethanol (12 g.), M.P. 129° C., there is obtained threo-1-formyloxy-1-phenyl-1-(2-piperidyl)methane hydrochloride, M.P. 168–169° C. (7.7 g.).

Example XIV 1-acetoxy-1-phenyl-1-(2-pyridyl)methane (5 g.) dissolved in pure acetic acid (50 cc.) is hydrogenated in the presence of Adams' platinum (0.5 g.) at ordinary temperature and pressure. The catalyst is filtered off and a solution of ethereal hydrochloric acid (160 g. per litre) (5 cc.) is added and the solution evaporated in vacuo. The oily residue is taken up in hot methyl ethyl ketone (12 cc.) from which a colourless crystalline product is precipitated. The product is separated, washed with methyl ethyl ketone then with anhydrous ether and dried to give the hydrochloride of threo-1-acetoxyl-1-phenyl-1-(2-piperidyl)methane (1 g.), M.P. 229–230° C. (cap.).

1-acetoxy-1-phenyl-1-(2-pyridyl)methane, B.P. 148–150° C. under a pressure of 1 mm. of mercury, may be obtained by the action of acetic anhydride on 2-pyridylphenylmethanol, a solid melting at 76° C.

Example XV

Threo-1-(4-methylphenyl) - 1 - (2-piperidyl)methanol hydrochloride (22.4 g.), M.P. 144–145° C., is mixed with acetic anhydride (50 cc.) and acetyl chloride (200 cc.) and heated under reflux for ½ hour. From the beginning of heating consecutive dissolution and precipitation are observed. The precipitate is filtered off, washed with ether, dried in vacuo and recrystallised from ethanol. There is obtained the hydrochloride of threo-1-acetoxy-1-(4-methylphenyl)-1-(2-piperidyl)methane (18.1 g.), M.P. 221–223° C.

The hydrochloride used as starting material may be obtained by adding ethanolic hydrogen chloride to an ethanolic solution of threo-1-(4-methylphenyl)-1-(2-piperidyl)methanol, evaporating the solution to dryness and treating the residue with methyl ethyl ketone.

Threo-1-(4-methylphenyl) - 1 - (2-piperidyl)methanol, M.P. 156.5–158.5° C., may be obtained by the hydrolysis with silver nitrate of 1-(4-methylphenyl)-1-(2-piperidyl)-chloromethane hydrochloride, M.P. 200–201° C., itself obtained by the action of thionyl chloride in chloroform upon 1-(4-methylphenyl) - 1 - (2-piperidyl)methanol (a mixture of erythro and threo forms) obtained by the hydrogenation in acetic acid in the presence of Adams' platinum catalyst of 2 - (4 - methylbenzoyl)pyridine (picrate, M.P. 171–173° C.).

Example XVI

A solution of the hydrochloride of threo-1-(4-methoxyphenyl)-1-(2-piperidyl)methanol (18.2 g.), M.P. 153–155° C., acetyl chloride (135 cc.) and acetic anhydride (45 cc.) in chloroform (130 cc.) is boiled for 1½ hours. There is obtained the hydrochloride of threo-1-acetoxy-1-(4-methoxyphenyl) - 1 - (2-piperidyl)methane (10.7 g.)

which melts at 191° C. after recrystallisation from a mixture of methanol and ether (1:1).

The hydrochloride starting material may be prepared by one of the methods described in the previous examples.

The threo - 1 - (4 - methoxyphenyl)-1-(2-piperidyl)-methanol, M.P. 180° C., is obtained from 1-(4-methoxyphenyl) - 1 - (2-piperidyl)chloromethane hydrochloride, M.P. 206–208° C., which is obtained by the consecutive hydrogenation and chlorination of 2-(4-methoxybenzoyl)-pyridine, M.P. 96° C.

Example XVII

Proceeding as in the preceding example but commencing with the hydrochloride of threo-1-(4-chlorophenyl)-1-(2-piperidyl)methanol M.P. 254° C. (base, M.P. 155° C.) and boiling for 30 minutes only, there is obtained a 93% yield of the hydrochloride of threo-1-acetoxy-1-)4-chlorophenyl)-1-(2-piperidyl)methane, which has M.P. 222–223° C. after recrystallisation from water.

The hydrochloride of threo-1-(4-chlorophenyl)-1-(2-piperidyl)methanol employed as starting material precipitates directly from the liquors from the hydrolysis with boiling hydrochloric acid of 1-(4-chlorophenyl)-1-(2-piperidyl)-chloromethane hydrochloride. The latter compound is itself obtained by the action of thionyl chloride upon the mixture of alcohols of erythro and threo forms resulting from the catalytic reduction of 2-(4-chlorobenzoyl)pyridine.

Example XVIII

Threo - 1 - (4-bromophenyl)-1-(2-piperidyl)methanol (13.4 g.), M.P. 157° C., is dissolved in anhydrous chloroform (134 cc.). A 20% solution (13.4 cc.) of anhydrous hydrogen chloride in anhydrous ether is added gradually with cooling to below 20° C. A clear solution is obtained to which there is added gradually with agitation acetic anhydride (28 cc.) followed by acetyl chloride (115 cc.); after 5 minutes' contact the solution becomes cloudy and a colourless crystalline precipitate begins to form which is filtered off after allowing the mixture to stand 2 hours at 20° C. The product filtered off is first washed with anhydrous acetone (2×50 cc.) and then with anhydrous ether (3×50 cc.). It is dried at 40° C. under a pressure of 0.5 mm. Hg.

There is obtained the hydrochloride of threo-1-acetoxy-1-(4-bromophenyl)-1-(2-piperidyl)methane (16.2 g.) M.P. 218–219° C.

The hydrochloride of threo-1-(4-bromophenyl)-1-(2-piperidyl)methanol, M.P. 242–244° C., precipitates directly from the liquors from the hydrolysis of 1-(4-bromophenyl)-1-(2-piperidyl)chloromethane, M.P. 248–249° C., with boiling 2 N hydrochloric acid. This chloro derivative is obtained by the action of thionyl chloride upon the product of the catalytic reduction of 2-(4-bromobenzoyl)pyridine, B.P. 140–145° C./0.2 mm. Hg, and M.P. 30–31° C. Its picrate melts at 149–150° C. and its phenylhydrazone at 194–195° C.

Example XIX

The homogeneous mixture of acetyl chloride (115 cc.), acetic anhydride (30 cc.) and the hydrochloride of threo-1-(3:4-methylenedioxyphenyl)-1-(2 - piperidyl)methanol (11.5 g.), M.P. 190–192° C., is boiled for ½ hour in the presence of acetone. There is obtained the hydrochloride of threo-1-acetoxy-1-(3:4-methylenedioxyphenyl)-1-(2-piperidyl)methane (14 g.) which melts at 212–213° C. after recrystallisation from methanol.

The threo-1-(3:4-methylenedioxyphenyl) - 1 - (2-piperidyl)methanol, M.P. 145° C., which is used to prepare the corresponding hydrochloride is obtained from 1-(3:4-methylenedioxyphenyl)-1 - (2 - piperidyl)chloromethane whose hydrochloride melts at 160.5–161.5° C., itself obtained by the action of thionyl chloride in chloroform upon 1-(3:4-methylenedioxyphenyl)-1-(2-piperidyl)methanol as a mixture of erythro and threo forms resulting from the hydrogenation of 2-(3:4-methylenedioxybenzoyl)pyridine, M.P. 139° C. (picrate, M.P. 177–178° C.), or of 1-(3:4-methylenedioxyphenyl)-1-(2-pyridyl)-methanol, M.P. 70–71° C. (picrate, M.P. 158–159° C.).

Example XX

The homogeneous mixture of acetyl chloride (50 cc.), acetic anhydride (18 cc.), choloroform (25 cc.) and the hydrochloride of threo-1-(4-ethoxyphenyl) - 1 - (2-piperidyl)methanol (5 g.), whose base melts at 157–158° C., is boiled for 1½ hours. There is obtained the hydrochloride of threo-1-acetoxy-1-(4-ethoxyphenyl)-1-(2-piperidyl)methane (3.6 g.) which melts at 199–201° C. after recrystallisation from a mixture of isopropanol and isopropyl ether.

The threo-1-(4-ethoxyphenyl) - 1-(2-piperidyl)methanol, whose hydrochloride serves as starting material, is obtained from 1-(4-ethoxyphenyl)-1-(2-piperidyl)chloromethane, whose hydrochloride is itself obtained by the action of thionyl chloride in chloroform upon 1-(4-ethoxyphenyl)-1-(2-piperidyl)methanol, as a mixture of erythro and threo forms resulting from the catalytic hydrogenation in the presence of Adams' platinum catalyst of 2-(4-ethoxybenzoyl)-pyridine, M.P. 90° C.

Example XXI 2-phenyl-2-(2-piperidyl)ethanol hydrochloride (2.5 g.), M.P. 165–166° C. is mixed with acetic anhydride (7.5 cc.) and acetyl chloride (25 cc.). The mixture is agitated at 30° C. for 2 hours. The solution obtained is then concentrated by evaporation at a pressure of 20 mm. of mercury on a luke-warm water-bath. The residue is triturated with a mixture of acetone (37.5 cc.) and ether (210 cc.). The mixture is allowed to stand in a refrigerator and the crystals which form are separated, washed with ether and dried in vacuo. 1-acetoxy-2-phenyl-2-(2-piperidyl)-ethane hydrochloride (2.6 g.), M.P. 142° C. is thus obtained. The initial hydrochloride is obtained by the addition of a solution of ethereal hydrogen chloride to a solution in ethyl acetate of 2-phenyl-2-(2-piperidyl)ethanol, M.P. 88–90° C., itself obtained by the reduction with lithium aluminium hydride in anhydrous ether of methyl 2-phenyl-2-(2-piperidyl)acetate, the hydrochloride of which melts at 215–216° C.

There may similarly be prepared, for example, 1-propionoxy-2-phenyl-2-(2-piperidyl)ethane.

The present invention includes within its scope pharmaceutical compositions comprising one or more of the methanol esters of Formula III or of the corresponding β-ethanol esters (Formula IV) or an acid addition salt thereof, and a significant amount of a pharmaceutical carrier which may be either a solid material or a liquid.

Preparations for oral ingestion can be liquids or solids or any combination of these forms, such as solutions, suspensions, syrups, elixirs, emulsions, powders or tablets. Pharmaceutical preparations for administration of the active therapeutic agents in unit dose form can take the form of compressed powders (or tablets) or of a powder enclosed in a suitable capsule of absorbable material such as gelatin. These compressed powders (or tablets) can take the form of the active materials admixed with suitable excipients and/or diluents such as starch, lactose, stearic acid, magnesium stearate or dextrin.

In yet a further embodiment the active material may, as such or in the form of a diluted composition, be put up in powder packets and employed as such.

Preparations for parenteral administration may be sterile solutions or suspensions in water or other liquids, with or without the addition of soluble or insoluble diluents and/or solid or liquid excipients.

The percentage of active ingredient in the compositions of the invention may be varied, it being necessary that it should constitute a proportion such that a suitable dosage shall be obtained. Obviously several unit dosage forms may be administered at about the same time. In general, the preparations of the present invention should normally contain at least 0.02% by weight of active substance in the case of injectable solutions and at least 0.01% by weight of such substance in the case of oral preparations.

We claim:

1. A member of the class consisting of racemic mixtures and component enantiomorphs thereof of the esters of saturated fatty acids containing up to 3 carbon atoms and the threo-2-piperidylphenyl derivatives of alcohols containing 1 to 2 carbon atoms, and therapeutically useful acid addition salts thereof of the general formula:

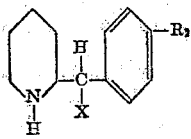

where X is selected from the group consisting of —OCOH, —OCOCH$_3$, —OCOC$_2$H$_5$, —CH$_2$OCOCH$_3$ and —CH$_2$OCOC$_2$H$_5$, and wherein R$_2$ is selected from the group consisting of hydrogen, halogen, lower alkyl, lower alkoxy and 3,4 methylene dioxy, the last mentioned being linked to the benzene nucleus in the 3 position also.

2. Therapeutically useful acid addition salts of threo-1-acetoxy-1-phenyl-1-(2-piperidyl) methane.

3. Therapeutically useful acid addition salts of laevo-rotatory threo-1-acetoxy-1-phenyl-1-(2-piperidyl) methane.

4. Therapeutically useful acid addition salts of threo-1-acetoxy-1-(4-methylphenyl)-1-(2-piperidyl) methane.

5. Therapeutically useful acid addition salts of threo-1-acetoxy-1-(4-methoxyphenyl)-1-(2-piperidyl) methane.

6. Therapeutically useful acid addition salts of threo-1-acetoxy-1-(4-chlorophenyl)-1-(2-piperidyl) methane.

7. Therapeutically useful acid addition salts of threo-1-acetoxy-1-(4-bromophenyl)-1-(2-piperidyl) methane.

8. Therapeutically useful acid addition salts of threo-1-acetoxy-1-(3:4-methylenedioxyphenyl)-1-(2-piperidyl) methane.

9. Therapeutically useful acid addition salts of threo-1-acetoxy-1-(4-ethoxyphenyl)-1-(2-piperidyl) methane.

10. Therapeutically useful acid addition salts of 1-acetoxy-2-phenyl-2-(2-piperidyl) ethane.

References Cited in the file of this patent

Crook et al.: J. Amer. Chem. Soc., vol. 52, p. 4010 (1930).